(12) United States Patent
Shimazumi

(10) Patent No.: US 9,550,909 B2
(45) Date of Patent: Jan. 24, 2017

(54) POLYVINYL ACETAL RESIN, SLURRY COMPOSITION PREPARED THEREFROM, CERAMIC GREEN SHEET, AND MULTILAYER CERAMIC CAPACITOR

(71) Applicant: KURARAY CO., LTD., Kurashiki-shi (JP)

(72) Inventor: Yuhi Shimazumi, Tokyo (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 14/881,826

(22) Filed: Oct. 13, 2015

(65) Prior Publication Data

US 2016/0032131 A1 Feb. 4, 2016

Related U.S. Application Data

(62) Division of application No. 13/817,041, filed as application No. PCT/JP2011/068459 on Aug. 12, 2011, now abandoned.

(30) Foreign Application Priority Data

Aug. 19, 2010 (JP) .................................. 2010-183815

(51) Int. Cl.

| | |
|---|---|
| C09D 129/04 | (2006.01) |
| C08L 29/04 | (2006.01) |
| C08K 5/00 | (2006.01) |
| C04B 35/468 | (2006.01) |
| C04B 35/634 | (2006.01) |
| H01G 4/12 | (2006.01) |
| H01G 4/30 | (2006.01) |
| C08F 216/38 | (2006.01) |
| C08F 116/06 | (2006.01) |
| C08K 3/22 | (2006.01) |
| C08K 5/01 | (2006.01) |

(52) U.S. Cl.
CPC ......... *C09D 129/04* (2013.01); *C04B 35/4682* (2013.01); *C04B 35/6342* (2013.01); *C08F 116/06* (2013.01); *C08F 216/38* (2013.01); *H01G 4/12* (2013.01); *H01G 4/30* (2013.01); *C04B 2235/3236* (2013.01); *C08K 3/22* (2013.01); *C08K 5/01* (2013.01); *C08K 2003/2241* (2013.01)

(58) Field of Classification Search
CPC   C04B 35/4682; C04B 35/6342; C08F 116/06; C08F 216/38; C09D 129/04; H01G 4/12; H01G 4/30

See application file for complete search history.

(56) References Cited

U.S. PATENT DOCUMENTS

| | | | |
|---|---|---|---|
| 2,269,217 A | 1/1942 | McNally et al. | |
| 2,345,946 A | 4/1944 | Overbaugh | |
| 5,691,101 A * | 11/1997 | Ushirogouchi | ....... G03F 7/0045 430/176 |
| 6,255,033 B1 | 7/2001 | Levanon et al. | |
| 6,541,181 B1 | 4/2003 | Levanon et al. | |
| 2006/0014049 A1 | 1/2006 | Ichinose et al. | |
| 2007/0262496 A1* | 11/2007 | Frank | .................... C04B 35/111 264/603 |
| 2009/0093609 A1 | 4/2009 | Shibutani et al. | |
| 2010/0112480 A1 | 5/2010 | Hirose et al. | |

FOREIGN PATENT DOCUMENTS

| | | |
|---|---|---|
| CN | 101426821 A | 5/2009 |
| GB | 566004 | 12/1944 |
| JP | 8 328242 | 12/1996 |
| JP | 2001 89245 | 4/2001 |
| JP | 2006 58430 | 3/2006 |
| JP | 2006 89354 | 4/2006 |
| JP | 2008 133371 | 6/2006 |
| JP | 2009 108305 | 5/2009 |
| TW | 200916509 A | 4/2009 |
| WO | WO 01/09682 A2 | 2/2001 |
| WO | 2004 101465 | 11/2004 |

OTHER PUBLICATIONS

International Search Report Issued Nov. 8, 2011 in PCT/JP11/68459 Filed Aug. 12, 2011.
Extended European Search Report issued Jul. 10, 2014 in Patent Application No. 11818159.3.
Taiwanese Office Action with Search Report, dated Mar. 9, 2015, in Taiwanese Patent Application No. 100129743, with English Translation (14 pages).

\* cited by examiner

*Primary Examiner* — Alexa Neckel
*Assistant Examiner* — Marie Reddick
(74) *Attorney, Agent, or Firm* — Oblon, McClelland, Maier & Neustadt, L.L.P.

(57) ABSTRACT

A slurry composition, including: a polyvinyl acetal resin; a ceramic powder; and an organic solvent. The polyvinyl acetal resin has a degree of polymerization of from 200 to 6000, a content percentage of vinylester unit of from 0.01 to 30 mol %, and a degree of acetalization of from 55 to 83 mol %. The polyvinyl acetal resin has a structural unit of formula (1) in the molecule:

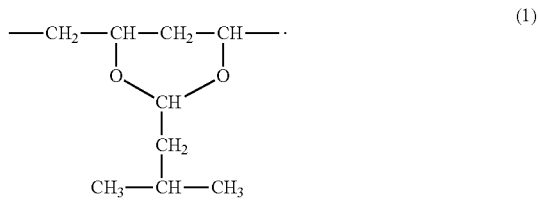

20 Claims, No Drawings

POLYVINYL ACETAL RESIN, SLURRY COMPOSITION PREPARED THEREFROM, CERAMIC GREEN SHEET, AND MULTILAYER CERAMIC CAPACITOR

CROSS REFERENCES TO RELATED APPLICATIONS

This application is a division of U.S. patent application Ser. No. 13/817,041, filed Feb. 14, 2013, now abandoned, which is the National Stage of the International Patent Application No. PCT/JP2011/068459, filed Aug. 12, 2011, the disclosures of which are incorporated herein by reference in their entireties. This application claims priority to Japanese application No. 2010-183815, filed Aug. 19, 2010.

TECHNICAL FIELD

The present invention relates to a polyvinyl acetal resin that is suitably used as a binder of a ceramic green sheet, and a slurry composition using the polyvinyl acetal resin, a ceramic green sheet, a conductive paste, and a laminated ceramic capacitor.

BACKGROUND ART

In the case of producing a laminated ceramic capacitor, generally the following production method is employed. Firstly, a binder resin such as a polyvinyl butyral resin, and a plasticizer are added into an organic solvent in which ceramic powders have been dispersed, the resultant is mixed homogeneously by a ball mill or the like to prepare a slurry composition. The prepared slurry composition is casted on a strippable support of polyethylene terephthalate film and the like, and the solvent and the like are removed by heating and the like, and then the resultant is stripped off from the support to obtain a ceramic green sheet.

Next, plural ceramic green sheets on the surfaces of which a conductive paste that becomes an internal electrode has coated by a screen printing or the like, are piled up alternately, and a laminated body thereof is obtained by heating, clamping, and the like, and then the laminated body is cut into a predetermined shape. Subsequently, a treatment in which the binder components and the like contained in the laminated body are pyrolytically decomposed and removed, so-called a delipidation treatment, is performed, and then by performing a step of sintering an external electrode on the end face of the ceramic burned product obtained through firing, a laminated ceramic capacitor is obtained. Therefore, in the case of the above ceramic green sheet, favorable working properties in the preparation of slurry composition and further improvement of the strength capable of withstanding these steps of processes are required.

Recent years, with the diversification and miniaturization of an electronic equipment, in the case of a laminated ceramic capacitor, the capacity enlargement and the miniaturization are required. In response to the above situation, as a ceramic powder used for a ceramic green sheet, a ceramic powder with a minute particle diameter of 0.5 µm or less is used, and an attempt to coat on the strippable support has been conducted so that the above slurry composition can be in a film state around 5 µm or less.

However, when a ceramic powder with a minute particle diameter is used, the packing density and the surface area are increased, and thus the amount of the binder resin to be used is increased. According to this situation, the viscosity of slurry composition is increased, therefore, the coating becomes difficult and the poor dispersion of the ceramic powder itself has been generated. In addition, in the steps of the preparation of a ceramic green sheet, stress such as tension, and bending is loaded, therefore, in order to withstand such a stress, a resin with a high degree of polymerization is used as a binder resin.

In Patent Literature 1 (Japanese Patent Application Laid-Open (JP-A) No. 2006-089354), there is a disclosure that a ceramic green sheet obtained from a slurry composition that contains a polyvinyl acetal resin in which the degree of polymerization exceeds 2400 and is 4500 or less, the content percentage of vinylester unit is 1 to 20 mol %, the degree of acetalization is 55 to 80 mol %; ceramic powders; and an organic solvent, is excellent in mechanical strength.

However, recently a much thinner ceramic green sheet is required, and when the thickness is 2 µm or less in the case that a super thin layer of ceramic green sheet is prepared from a slurry composition containing the above ceramic powders, a problem that a seat attack phenomenon easily occurs is caused.

Herein, the seat attack phenomenon is a phenomenon of generating a defect such as break in a ceramic green sheet by dissolving the binder resin that is contained in the ceramic green sheet due to an organic solvent in a conductive paste when the conductive paste to be an internal electrode layer is printed on the obtained ceramic green sheet. When the seat attack phenomenon occurs, the electrical performance and reliability of the laminated ceramic capacitor are decreased, and the yield is extremely decreased.

In Patent Literature 2 (JP-A No. 2008-133371), there is a disclosure of a polyvinyl acetal resin that is obtained by acetalizing a polyvinyl alcohol resin with a degree of saponification of 80 mol % or more, and a number-average degree of polymerization of 1000 to 4000, and characterized in that the degree of acetalization is 60 to 75 mol %, and the ratio of the moiety acetalized by acetaldehyde and the moiety acetalized by butyraldehyde (mol number of the hydroxyl group disappeared by the acetalization of butyraldehyde/mol number of the hydroxyl group disappeared by the acetalization of acetaldehyde) is 0.1 to 2.

However, the miniaturization of the laminated ceramic capacitor has limitation, and in order to increase the capacity of chip or to miniaturize the size while keeping the capacity, in addition to making the ceramic green sheet thinner, a multi-layered is also required. With such a multi-layered sheet and the miniaturization, the hygroscopicity in the storage of a ceramic green sheet has become a problem. That is, there may be cases that when a binder resin absorbs moisture in the storage of a ceramic green sheet, the dimensional change occurs; and since thin films are laminated into a multi-layered form, when the amount of moisture per layer is large, water evaporates at a stretch and interlayer peeling called delamination occurs in the delipidation. Therefore, the humidity control in the storage of a ceramic green sheet, and the adjustment of delipidation conditions are extremely important.

For example, since the glass transition temperature of the polyvinyl acetal denatured by acetaldehyde becomes high, the mechanical strength can be improved, however, since the hydrophobicity of acetaldehyde is low, the hygroscopicity is also high in an acetal product mixed with butylaldehyde, and the above problem was not satisfied. Further, even in an acetal product denatured by only butylaldehyde, sufficient low hygroscopicity was not satisfied.

As described above, in Patent Literatures 1 and Patent Literatures 2, there is no disclosure of the polyvinyl acetal resin having both the properties that the dimensional change in the storage of a ceramic green sheet is small, and the delamination hardly occurs in the delipidation.

CITATION LIST

Patent Literature

Patent Literature 1: Japanese Patent Application Laid-Open (JP-A) No. 2006-089354
Patent Literature 2: JP-A No. 2008-133371

SUMMARY OF INVENTION

Technical Problem

In view of the situation described above, an object of the present invention is to provide a polyvinyl acetal resin capable of obtaining a ceramic green sheet, in which when the polyvinyl acetal resin is used as a binder resin of the ceramic green sheet, the mechanical strength is sufficient, the dimensional change in the storage is small, and further the delamination hardly occurs in the delipidation. In addition, an object of the present invention is also to provide a slurry composition using the polyvinyl acetal resin, a ceramic green sheet, conductive paste, and a laminated ceramic capacitor.

Solution to Problem

The present inventors, as a result of the keen study, found that the polyvinyl acetal resin that has a degree of polymerization of 200 or more to 6000 or less, a content percentage of vinylester unit of 0.01 to 30 mol %, a degree of acetalization of 55 to 83 mol %, and a structural unit represented by Chemical formula (1) in a molecule shows high glass transition temperature and low water absorption. In addition, particularly when the polyvinyl acetal resin is used as a binder resin of a slurry composition that is used for a ceramic green sheet, the present inventors also found that the mechanical strength is sufficient, the dimensional change in the storage is small, and further the delamination hardly occurs in the delipidation even in a thinner ceramic green sheet, and thus have completed the present invention.

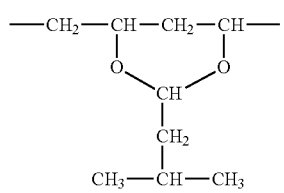
(1)

That is, the present invention relates to a polyvinyl acetal resin that has a degree of polymerization of 200 or more to 6000 or less, a content percentage of vinylester unit of 0.01 to 30 mol %, a degree of acetalization of 55 to 83 mol %, and a structural unit represented by Chemical formula (1) in a molecule.

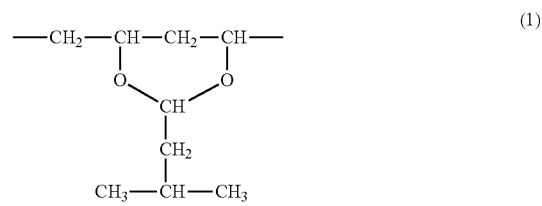
(1)

The degree of polymerization of polyvinyl acetal resin preferably exceeds 1500 and is 4500 or less.

The polyvinyl acetal resin is obtained preferably by acetalizing a polyvinyl alcohol resin by using aldehyde that contains 3-methylbutanal.

The polyvinyl acetal resin further preferably has a structural unit represented by Chemical formula (2) and/or Chemical formula (3) in the molecule.

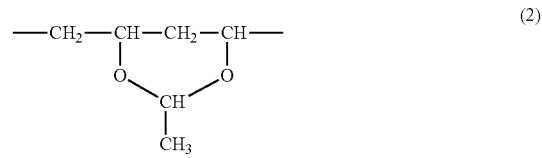
(2)

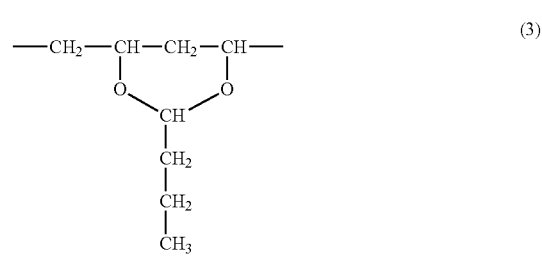
(3)

In the above-mentioned polyvinyl acetal resin, preferably the structural unit represented by Chemical formula (1) is contained in 30 mol % or more relative to the total molar amount of all the acetalized structural units.

The present invention relates to a slurry composition containing the above-mentioned polyvinyl acetal resin, ceramic powders, and an organic solvent.

The present invention relates to a ceramic green sheet obtained by using the above-mentioned slurry composition.

The present invention relates to a conductive paste containing the above-mentioned polyvinyl acetal resin and conductive powders.

The present invention relates to a laminated ceramic capacitor obtained by using the above-mentioned ceramic green sheet.

The present invention relates to a laminated ceramic capacitor obtained by using the above-mentioned conductive paste.

Advantageous Effects of Invention

According to the present invention, when the polyvinyl acetal resin is used as a binder resin of a ceramic green sheet, a polyvinyl acetal resin capable of obtaining a ceramic green sheet, in which the mechanical strength is sufficient, the dimensional change in the storage is small, and further the delamination hardly occurs in the delipidation, is provided.

Further, the polyvinyl acetal resin of the present invention can be used as a binder resin of the conductive paste to be an internal electrode.

DESCRIPTION OF EMBODIMENTS

Hereinafter, the present invention is explained in detail.

The degree of polymerization of the polyvinyl acetal resin of the present invention is 200 or more to 6000 or less. In the case that the degree of polymerization of the polyvinyl acetal resin is less than 200, when a thin film ceramic green sheet is prepared, the mechanical strength is insufficient, and on the other hand, in the case that the degree of polymerization exceeds 6000, the polyvinyl acetal resin is not sufficiently dissolved in an organic solvent, or the solution viscosity is too high, and thus the coating property and the dispersibility may be decreased. The degree of polymerization of the polyvinyl acetal resin is preferably 800 or more, more preferably 1000 or more, further preferably more than 1500, particularly preferably 1700 or more, and the most preferably more than 2000. Further, the degree of polymerization of the polyvinyl acetal resin is preferably 4500 or less, and more preferably 3500 or less.

The polyvinyl acetal resin can be produced, for example, by acetalizing a polyvinyl alcohol resin with a degree of polymerization of 200 or more to 6000 or less by using aldehyde that contains at least 3-methylbutanal. The degree of polymerization of the polyvinyl alcohol resin is preferably 800 or more, more preferably 1000 or more, further preferably more than 1500, particularly preferably 1700 or more. Further, the degree of polymerization of the polyvinyl alcohol resin is preferably 4500 or less, and more preferably 3500 or less.

Further, the degree of polymerization is determined from both of the viscosity average degree of polymerization of the polyvinyl alcohol that is used for the production of a polyvinyl acetal resin and the viscosity average degree of polymerization of polyvinyl acetal resin. That is, since the degree of polymerization is not changed by acetalization, the degree of polymerization of polyvinyl alcohol resin and the degree of polymerization of the polyvinyl acetal resin obtained by acetalizing the polyvinyl alcohol resin are the same. Herein, the viscosity average degree of polymerization of polyvinyl alcohol resin refers to an average degree of polymerization determined based on JIS K6726:1994. Further, when two or more kinds of polyvinyl alcohol resins are used in a mixture as a polyvinyl alcohol resin, the degree of polymerization thereof refers to an apparent average degree of polymerization of the total polyvinyl alcohol resins after the mixture. On the other hand, the degree of polymerization of polyvinyl acetal resin refers to a viscosity average degree of polymerization measured based on a method described in JIS K6728:1977. Herein also, when the polyvinyl acetal resin is a mixture of two or more kinds of polyvinyl acetal resins, the degree of polymerization thereof refers to an apparent viscosity average degree of polymerization of the total polyvinyl acetal resins after the mixture.

The lower limit of the content percentage of vinylester unit of polyvinyl acetal resin is 0.01 mol %, and the upper limit is 30 mol %. When the content percentage of vinylester unit of polyvinyl acetal resin is less than 0.01 mol %, the hydrogen bonds in a molecule and between molecules of the hydroxyl group in polyvinyl acetal resin are increased, the viscosity of a slurry composition is too high, the solubility to the organic solvent used for a conductive paste is also too high, and thus a seat attack phenomenon occurs. On the other hand, when the content percentage of vinylester unit of polyvinyl acetal resin exceeds 30 mol %, the glass transition temperature of polyvinyl acetal resin is decreased, the flexibility is too strong, and thus the handling ability, the mechanical strength, and the dimensional stability in the storage are decreased in a ceramic green sheet. The preferable lower limit of the content percentage of vinylester unit is 0.5 mol %, the preferable upper limit is 23 mol %, and the more preferable upper limit is 20 mol %.

The polyvinyl acetal resin having a content percentage of vinylester unit of 0.01 to 30 mol % can be obtained by acetalizing, for example, a polyvinyl alcohol resin having a content percentage of vinylester unit of 0.01 to 30 mol %, typically, a polyvinyl alcohol resin having a degree of saponification of 70 to 99.99 mol %. The preferable lower limit of the degree of saponification of the polyvinyl alcohol resin is 77 mol %, the more preferable lower limit is 80 mol %, and the preferable upper limit is 99.5 mol %. Herein, the content percentage of vinylester unit of the present specification means a component ratio of the molar amount of the vinylester units to the total molar amount of the vinylester units, the vinyl alcohol units, and the acetalized vinyl alcohol units.

The lower limit of the degree of acetalization of the polyvinyl acetal resin is 55 mol %, and the upper limit is 83 mol %. When the degree of acetalization of the polyvinyl acetal resin is less than 55 mol %, the hydrophilicity of the polyvinyl acetal resin is increased and the polyvinyl acetal resin is hardly dissolved in an organic solvent, and further, the dimensional change occurs due to the water absorption in the storage of a ceramic green sheet, and the delamination occurs in the delipidation. On the other hand, when the degree of acetalization of the polyvinyl acetal resin is more than 83 mol %, the remaining hydroxyl groups are decreased, and not only the toughness of the polyvinyl acetal resin is impaired but also the productivity is decreased. Therefore, the preferable lower limit of the degree of acetalization is 60 mol %, the more preferable lower limit is 65 mol %, and the preferable upper limit is 80 mol %. Herein, the degree of acetalization in the present specification is not calculated based on the acetalized structural units but is calculated based on the molar amount of acetalized vinyl alcohol units. That is, the degree of acetalization means a component ratio of the molar amount of the acetalized vinyl alcohol units to the total molar amount of the vinylester units, the vinyl alcohol units, and the acetalized vinyl alcohol units.

As a method of adjusting the degree of acetalization of the polyvinyl acetal resin of the present invention to 55 to 83 mol %, for example, a method in which the addition amount of aldehyde to the polyvinyl alcohol resin, the reaction time after the addition of aldehyde and an acid catalyst, and the like are appropriately adjusted is mentioned. For example, aldehyde is preferably added in an amount of 30 to 150 parts by mass relative to 100 parts by mass of polyvinyl alcohol resin.

The content percentage of vinylester unit, the content percentage of vinyl alcohol unit, and the degree of acetalization of the polyvinyl acetal resin can be calculated by dissolving the polyvinyl acetal resin in DMSO-$d_6$ (dimethyl sulfoxide) and measuring the $^1$H-NMR or the $^{13}$C-NMR spectrum.

As a polyvinyl acetal resin of the present invention, a resin obtained by reacting (acetalizing) the polyvinyl acetal resin with the aldehyde described later can be used. Such a polyvinyl acetal resin can be obtained according to a conventionally known technique, that is, by polymerizing vinylester-based monomer and saponifying the obtained polymer. As a method for polymerizing vinylester-based monomer, a conventionally known method such as a solution polymerization method, a bulk polymerization method, a suspension polymerization method, and an emulsion polymerization method can be employed. As a polymerization initiator, depending on the polymerization method, an azo-based initiator, a peroxide-based initiator, a redox-based initiator, and the like can be appropriately selected. As for the saponification reaction, alcoholysis, hydrolysis, and the like in which a conventionally known alkali catalyst or acid catalyst is used are applied, among them a saponification reaction in which a sodium hydroxide (NaOH) catalyst is employed using methanol as a solvent is easy and the most preferable.

Examples of the vinylester-based monomer, for example, include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, and vinyl benzoate, and particularly vinyl acetate is preferred.

Further, when the above-mentioned vinylester-based monomer is polymerized, other monomers can be copolymerized within the range not impairing the gist of the present invention. Therefore, the polyvinyl alcohol resin of the present invention has a concept including also the polymer that is constituted of vinyl alcohol unit and other monomer units. Examples of the other monomer units include, for example, $\alpha$-olefin such as ethylene, propylene, n-butene, and isobutylene; acrylic acid and a salt thereof; acrylates such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid and a salt thereof; methacrylates such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamides such as acrylamide, N-methyl acrylamide, N-ethyl acrylamide, N,N-dimethyl acrylamide, diacetone acrylamide, acrylamide propanesulfonic acid and a salt thereof, acrylamide propyl dimethylamine or an acid salt thereof or a quaternary salt thereof, and N-methylol acrylamide and a derivative thereof; methacrylamides such as methacrylamide, N-methyl methacrylamide, N-ethyl methacrylamide, methacrylamide propanesulfonic acid and a salt thereof, methacrylamido propyl dimethylamine or an acid salt thereof or a quaternary salt thereof, and N-methylol methacrylamide and a derivative thereof; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; nitriles such as acrylonitrile, and methacrylonitrile; vinyl halide such as vinyl chloride, and vinyl fluoride; vinylidene halide such as vinylidene chloride, and vinylidene fluoride; an allylic compound such as allyl acetate, and allyl chloride; maleic acid and a salt thereof, ester or an acid anhydride thereof; a vinylcyril compound such as vinyl trimethoxy silane; and isopropenyl acetate. These monomers are usually used at a ratio of 20 mol % or less, and more preferably less than 10 mol % relative to vinylester-based monomers.

As the acid catalyst used for acetalization, it is not particularly limited, both organic acid and inorganic acid can be used, for example, acetic acid, p-toluenesulfonic acid, nitric acid, sulfuric acid, hydrochloric acid, and the like can be mentioned. Among them, hydrochloric acid, sulfuric acid, and nitric acid are preferably used, and especially, hydrochloric acid, and sulfuric acid are preferably used.

A polyvinyl acetal resin of the present invention can be obtained according to the following method. Firstly, an aqueous solution of polyvinyl alcohol resin with a concentration of 3 to 15 mass % is adjusted to the temperature range of 80 to 100° C., and the temperature is gradually cooled over 10 to 60 minutes. When the temperature is lowered to −10 to 40° C., aldehyde and acid catalyst are added, and while the temperature is kept at a certain level, acetalization reaction is performed for 10 to 300 minutes. After that, the reaction mixture is heated to 15 to 80° C. over 30 to 200 minutes, and a ripening process in which the temperature is maintained for 0 to 360 minutes is preferably included. Next, the reaction mixture is cooled suitably to room temperature, washed with water, and then a neutralizer such as alkali is added, and the resultant is washed and dried, and thus an intended polyvinyl acetal resin is obtained.

In the polyvinyl acetal resin of the present invention, it is important to have a structural unit represented by the Chemical formula (1). As a method for obtaining such a polyvinyl acetal resin, for example, a method in which a polyvinyl alcohol resin is acetalized by using aldehyde that contains 3-methylbutanal can be mentioned. As described above, when 3-methylbutanal is used for acetalization, since the number of carbon atoms in a molecule is in the range of 2 to 6, the productivity of the polyvinyl acetal resin is excellent, further the structure becomes a structure in which an isopropyl group is further bound to the carbon atoms that is bound to two oxygen atoms in an acetal structure unit of the polyvinyl acetal resin, therefore, a coating film having good property balance and excellent resistance to moist heat is obtained.

Further, as the aldehyde used for acetalization of a polyvinyl alcohol resin, the following aldehyde may be used in combination within the range not impairing the gist of the present invention. That is, as the aldehyde containing an alkyl group, an aryl group, or the like as a substituent, for example, there are an aliphatic aldehyde such as acetaldehyde, propionaldehyde, butyraldehyde, isobutyraldehyde, 2-ethyl butyraldehyde, valeraldehyde, pivalic aldehyde, hexyl aldehyde, 2-ethylhexyl aldehyde, octyl aldehyde, nonyl aldehyde, decyl aldehyde, and dodecyl aldehyde, and an alkyl acetal thereof; an alicyclic aldehyde such as cyclopentane aldehyde, methyl cyclopentane aldehyde, dimethyl cyclopentane aldehyde, cyclohexane aldehyde, methyl cyclohexane aldehyde, dimethyl cyclohexane aldehyde, and cyclohexane acetaldehyde, and an alkyl acetal thereof; a cyclic unsaturated aldehyde such as cyclopentene aldehyde, and cyclohexene aldehyde, and an alkyl acetal thereof; an aromatic or unsaturated bond-containing aldehyde such as benzaldehyde, methyl benzaldehyde, dimethyl benzaldehyde, methoxy benzaldehyde, phenylacetaldehyde, phenylpropyl aldehyde, cumin aldehyde, naphthyl aldehyde, anthraldehyde, cinnamaldehyde, crotonaldehyde, acrolein, and 7-octene-1-al, and an alkyl acetal thereof; a heterocyclic aldehyde such as furfural, and methylfurfural, and an alkyl acetal thereof; and the like.

Further, as the aldehyde that can be used in combination for acetalization of a polyvinyl alcohol resin in the present invention and contains a hydroxyl group, a carboxyl group, a sulfonate group, or a phosphate group as a functional group, there are hydroxyl group-containing aldehyde such as hydroxyacetaldehyde, hydroxypropionaldehyde, hydroxybutyraldehyde, hydroxypentylaldehyde, salicylaldehyde, and dihydroxybenzaldehyde and an alkyl acetal thereof; acid-containing aldehyde such as glyoxylic acid and a metal salt thereof or an ammonium salt thereof, 2-formylacetic acid and a metal salt thereof or an ammonium salt thereof, 3-formylpropionic acid and a metal salt thereof or an ammonium salt thereof, 5-formylpentanoic acid and a metal salt thereof or an ammonium salt thereof, 4-formylphenoxyacetic acid and a metal salt thereof or an ammonium salt thereof, 2-carboxybenzaldehyde and a metal salt thereof or an ammonium salt thereof, 4-carboxybenzaldehyde and a metal salt thereof or an ammonium salt thereof, 2,4-dicarboxybenzaldehyde and a metal salt thereof or an ammonium salt thereof, benzaldehyde-2-sulfonic acid and a metal salt thereof or an ammonium salt thereof, benzaldehyde-2,4-disulfonic acid and a metal salt thereof or an ammonium salt thereof, 4-formylphenoxysulfonic acid and a metal salt thereof or an ammonium salt thereof, 3-formyl-1-propanesulfonic acid and a metal salt thereof or an ammonium salt thereof, 7-formyl-1-heptanesulfonic acid and a metal salt thereof or an ammonium salt thereof, 4-formylphenoxyphosphonic acid and a metal salt thereof or an ammonium salt thereof; and an alkyl acetal thereof; and the like.

Further, as the aldehyde that can be used in combination for acetalization of a polyvinyl alcohol resin and contains an amino group, a cyano group, a nitro group or a quaternary ammonium salt as a functional group, there are aminoacetaldehyde, dimethylaminoacetaldehyde, diethylaminoacetaldehyde, aminopropionaldehyde, dimethylaminopropionaldehyde, aminobutyraldehyde, aminopentylaldehyde, aminobenzaldehyde, dimethylaminobenzaldehyde, ethylmethylaminobenzaldehyde, diethylaminobenzaldehyde, pyrrolidylacetaldehyde, piperidylacetaldehyde, pyridylacetaldehyde, cyanoacetaldehyde, α-cyanopropionaldehyde, nitrobenzaldehyde, trimethyl-p-formylphenylammonium iodine, triethyl-p-formylphenylammonium iodine, trimethyl-2-formylethylammonium iodine, and an alkyl acetal thereof; and the like.

As the aldehyde that can be used in combination for acetalization of a polyvinyl alcohol resin and contains halogen as a functional group, there are chloroacetaldehyde, bromoacetaldehyde, fluoroacetaldehyde, chloropropionaldehyde, bromopropionaldehyde, fluoropropionaldehyde, chlorobutyraldehyde, bromobutylaldehyde, fluorobutyraldehyde, chloropentylaldehyde, bromopentylaldehyde, fluoropentylaldehyde, chlorobenzaldehyde, dichlorobenzaldehyde, trichlorobenzaldehyde, bromobenzaldehyde, dibromobenzaldehyde, tribromobenzaldehyde, fluorobenzaldehyde, difluorobenzaldehyde, trifluorobenzaldehyde, trichloromethylbenzaldehyde, tribromomethylbenzaldehyde, trifluoromethylbenzaldehyde, and an alkyl acetal thereof, and the like. For, example, formaldehyde (including paraformaldehyde), acetaldehyde (including paraacetaldehyde), propionaldehyde, butyraldehyde, amylaldehyde, hexylaldehyde, heptylaldehyde, 2-ethylhexylaldehyde, cyclohexylaldehyde, furfural, glyoxal, glutaraldehyde, benzaldehyde, 2-methylbenzaldehyde, 3-methylbenzaldehyde, 4-methylbenzaldehyde, p-hydroxybenzaldehyde, m-hydroxybenzaldehyde, phenylacetaldehyde, β-phenylpropionaldehyde, and the like may be used in combination.

Among them, when acetalization of the polyvinyl alcohol resin is performed by using the aldehyde other than 3-methylbutanal in combination, acetaldehyde is preferable in that the mechanical strength of the obtained polyvinyl acetal resin is excellent, and butyraldehyde is preferable in that the low hygroscopicity is excellent. Further, 3 kinds of aldehyde, that is, 3-methylbutanal, acetaldehyde, and butyraldehyde can be used in combination. By the acetalization using acetaldehyde, a structural unit represented by the Chemical formula (2) is introduced into a polyvinyl alcohol resin, and by the acetalization using butyraldehyde, a structural unit represented by the Chemical formula (3) is introduced into a polyvinyl alcohol resin.

As in the case of using butyraldehyde and/or acetaldehyde and 3-methylbutanal in combination, when the obtained polyvinyl acetal resin has a structural unit other than the structural unit represented by the Chemical formula (1) as an acetalized structural unit, a ratio of the structural unit represented by the Chemical formula (1) that corresponds to the structural unit acetalized by 3-methylbutanal is preferably 30 mol % or more relative to the total molar amount of all the acetalized structural units. Specifically, for example, as the structural unit of an acetalized polyvinyl acetal resin, when containing only a structural unit represented by Chemical formula (4):

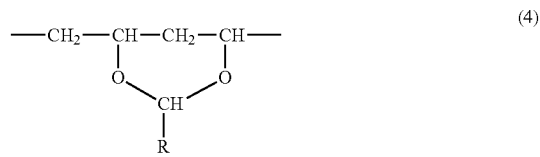

(in Chemical formula (4), R is a hydrogen atom or a hydrocarbon group having any number of carbon atoms (for example, a methyl group or a propyl group), hydrogen in the hydrocarbon group may be substituted with any atom or any functional group), a structural unit represented by Chemical formula (1) in the polyvinyl acetal resin is preferably 30 mol % or more relative to the total molar amount of the structural units represented by the Chemical formula (4) (all the acetalized structural units).

When the ratio of the structural units represented by the Chemical formula (1) that corresponds to the structural units acetalized by 3-methylbutanal is lower than 30 mol % relative to the total molar amount of all the acetalized structural units in the polyvinyl acetal resin, the hygroscopicity of the polyvinyl acetal resin is high, and the dimensional change in the storage of a ceramic green sheet and the delamination in the delipidation readily occur. The ratio of the structural units represented by the Chemical formula (1) that corresponds to the structural units acetalized by 3-methylbutanal is preferably 40 mol % or more, and more preferably 50 mol % or more. The ratio is determined by the following calculation formula.

Ratio (%)=molar amount of structural units represented by Chemical formula(1)/total molar amount of all the acetalized structural units×100

Aldehyde used for the polyvinyl acetal resin is preferably monoaldehyde (one aldehyde group in a molecule). When the acetalization is performed by a compound containing two or more aldehyde groups, since the stress-relaxation powers of a cross-linking site and an uncross-linking site are different from each other, warp may be generated after being stripped off from polyethylene terephthalate after drying. Therefore, the aldehyde to be used is preferably monoaldehyde alone, and even when the compound containing two or more aldehyde groups is used, the addition amount of the compound containing two or more aldehyde groups is preferably less than 0.005 mol %, and more preferably 0.003 mol % or less relative to the vinyl alcohol unit of a polyvinyl alcohol resin.

The polyvinyl acetal resin of the present invention may be a polyvinyl acetal resin containing α-olefin units. The preferable lower limit of the content of α-olefin units in such a polyvinyl acetal resin is 1 mol %, and the preferable upper limit is 20 mol %. When the content is less than 1 mol %, the effect of containing α-olefin units is insufficient, and when the content exceeds 20 mol %, the hydrophobicity becomes too strong, and the dispersibility of ceramic powder is decreased and the solubility of the polyvinyl alcohol resin to be a raw material is also decreased, therefore, the production of polyvinyl acetal resin may become difficult. In the specification, the content percentage of α-olefin unit in a polyvinyl acetal resin means a component ratio of the molar amount of α-olefin units relative to the total molar amount of all the structural units constituting the polyvinyl acetal resin. Herein, the acetalized structural units are used as the molar amount of acetalized vinyl alcohol units (usually, has doubled the molar amount of the acetalized structural units) to calculate the above total molar amount.

The glass transition temperature of the polyvinyl acetal resin of the present invention is preferably 72 to 100° C., and more preferably 75 to 95° C. When the glass transition temperature of the polyvinyl acetal resin is lower than 72° C., the mechanical strength becomes insufficient, on the other hand, when the glass transition temperature exceeds 100° C., the heating and crimping property is deteriorated, and the delamination tends to readily occur.

The slurry composition of the present invention contains the polyvinyl acetal resin, ceramic powders, and an organic solvent. Further, in the slurry composition, the polyvinyl acetal resin is usually used as a binder resin. Since the solution viscosity of the polyvinyl acetal resin of the present invention does not become too high even when the polyvinyl acetal resin is dissolved in a mixed solvent containing ethanol and toluene that are generally used in a production process of a ceramic green sheet at a ratio of 1:1, the slurry composition containing the polyvinyl acetal resin of the present invention has the coating property sufficiently. In addition, according to the above slurry composition, a ceramic green sheet having excellent mechanical strength, and favorable filling property can be obtained efficiently.

Further, the slurry composition of the present invention may contain an acryl-based resin, a cellulose-based resin, and the like as a binder resin in addition to the polyvinyl acetal resin. When a resin other than the above polyvinyl acetal resin, that is, an acryl-based resin, a cellulose-based resin, and the like is contained as a binder resin, the preferable lower limit of the content percentage of the polyvinyl acetal resin to the total binder resin is 30 mass %. When the content percentage of the polyvinyl acetal resin is less than 30 mass %, the mechanical strength and the heating and crimping property of the obtained ceramic green sheet may become insufficient.

As the above ceramic powder, it is not particularly limited, for example, a powder of alumina, zirconia, aluminum silicate, titanium oxide, zinc oxide, barium titanate, magnesia, sialon, spinemulrite, silicon carbide, silicon nitride, aluminum nitride, and the like is mentioned. These ceramic powders may be used alone, or may be used in combination of two or more kinds. The preferable upper limit of the content percentage of ceramic powder is 80 mass %, and the preferable lower limit is 30 mass %, relative to the total amount of the slurry composition of the present invention. When the content percentage of ceramic powder is less than 30 mass %, the viscosity of the obtained slurry composition becomes too low, and the handling ability becomes worse during the molding of a ceramic green sheet, on the other hand, when the content percentage is more than 80 mass %, the viscosity of the slurry composition is too high, and the kneading property tends to decrease.

As the above organic solvent, it is not particularly limited, for example, ketones such as acetone, methyl ethyl ketone, dipropyl ketone, and diisobutyl ketone; alcohols such as methanol, ethanol, isopropanol, and butanol; aromatic hydrocarbons such as toluene, and xylene; esters such as methyl propionate, ethyl propionate, butyl propionate, methyl butyrate, ethyl butyrate, butyl butyrate, methyl pentanoate, ethyl pentanoate, butyl pentanoate, methyl hexanoate, ethyl hexanoate, butyl hexanoate, 2-ethylhexyl acetate, and 2-ethylhexyl butyrate; glycols such as methyl cellosolve, ethyl cellosolve, butyl cellosolve, α-terpineol, butyl cellosolve acetate, and butyl carbitol acetate; terpenes such as terpineol; and the like are mentioned. These organic solvents may be used alone, or may be used in combination of two or more kinds. Above all, a mixed solvent of toluene and xylene is preferably used. The content percentage of the organic solvent is preferably 20 mass % or more to less than 70 mass % relative to the total amount of the slurry composition of the present invention. In the above range, appropriate kneading property can be given to the slurry composition of the present invention. When the content percentage of the organic solvent is 70 mass % or more, the viscosity is too low, and the handling ability becomes worse during the molding of a ceramic green sheet, on the other hand, when the content percentage is less than 20 mass %, the viscosity of the slurry composition becomes too high, and the kneading property tends to decrease.

The slurry composition of the present invention may contain a conventionally known additive such as a plasticizer, a lubricant, a dispersant, an antistatic agent, and an antioxidant within the range not impairing the effects of the present invention.

The kind of the plasticizer is not particularly limited, however, for example, a phthalate plasticizer such as dioctyl phthalate, benzyl butyl phthalate, dibutyl phthalate, dihexyl phthalate, di(2-ethylhexyl) phthalate (DOP), and di(2-ethylbutyl) phthalate; an adipate plasticizer such as dihexyl adipate, and di(2-ethylhexyl) adipate (DOA); a glycol-based plasticizer such as ethylene glycol, diethylene glycol, and triethylene glycol; a glycol ester-based plasticizer such as triethylene glycol dibutyrate, triethylene glycol di(2-ethyl butyrate), and triethylene glycol di(2-ethylhexanoate); and the like are mentioned. These can be used in combination of two or more kinds. The content percentage of the plasticizer is not particularly limited, however, preferably 0.1 to 10 mass %, and more preferably 1 to 8 mass % relative to the total amount of the slurry composition. Among them, since the volatility is low, and the flexibility is easily maintained in the case of a ceramic green sheet, and thus DOP, DOA, and triethylene glycol (2-ethylhexanoate) are suitable.

As a method for producing a slurry composition using the polyvinyl acetal resin of the present invention, it is not particularly limited, for example, a method in which a binder resin containing the above polyvinyl acetal resin, ceramic powders, an organic solvent, and various additives that add as needed, are mixed using various mixers such as a ball mill, a blender mill, a three-roller milling machine, or the like is employed.

Since the slurry composition of the present invention has the above described constitution, a thin film ceramic green sheet having sufficient mechanical strength can be produced. The present invention includes a ceramic green sheet that is obtained using such a slurry composition.

As a production method of a ceramic green sheet of the present invention, it is not particularly limited, a ceramic green sheet can be produced by a conventionally known production method, for example, a method in which the slurry composition of the present invention is casted on a strippable support of polyethylene terephthalate film and the like, and the solvent and the like are removed by heating and the like, and then the resultant is stripped off from the support, and the like are mentioned.

The conductive paste of the present invention contains the above polyvinyl acetal resin, and conductive powders, and preferably contains the above polyvinyl acetal resin, conductive powders and an organic solvent.

The conductive paste of the present invention may contain a resin other than the above polyvinyl acetal resin, such as an acryl-based resin, and a cellulose-based resin as a binder resin, in addition to the polyvinyl acetal resin. When an acryl-based resin, a cellulose-based resin, and the like are contained as a binder resin, the preferable lower limit of the content percentage of the above polyvinyl acetal resin to the total binder resin is 30 mass %. When the content percentage of the polyvinyl acetal resin is less than 30 mass %, the adhesive property between layers tends to decrease.

As the conductive powder used for the conductive paste of the present invention, it is not particularly limited as long as it has electrical conductivity, for example, copper, nickel, palladium, platinum, gold, silver, and the like are mentioned. The preferable upper limit of the content percentage of the conductive powder is 70 mass %, and the preferable lower limit is 30 mass %, relative to the total amount of the conductive paste. When the content percentage of the conductive powder is less than 30 mass %, there are few conductive components and many organic components, and thus the change of the shrinkage percentage after firing is large, and further the carbon components may easily remain. On the other hand, when the content percentage of the conductive powder exceeds 70 mass %, the viscosity of the conductive paste is too high, and thus the coating property and the printability tend to decrease.

As the organic solvent used for the conductive paste of the present invention, it is not particularly limited, and the same organic solvent as that exemplified in the above as an organic solvent used for the slurry composition of the present invention, can be used. These organic solvents may be used alone, or may be used in combination of two or more kinds. The preferable upper limit of the content percentage of the organic solvent is 70 mass %, and the preferable lower limit is 20 mass %, relative to the total amount of the conductive paste of the present invention. When the content percentage of organic solvent is less than 20 mass %, the viscosity is too high, and thus the kneading property tends to decrease, on the other hand, when the content percentage is more than 70 mass %, the viscosity of the slurry composition is too low, and the handling ability tends to deteriorate when the conductive paste is coated.

The conductive paste of the present invention may contain a conventionally known additive such as a plasticizer, a lubricant, a dispersant, and an antistatic agent within the range not impairing the effects of the present invention.

As a method for producing the conductive paste of the present invention, it is not particularly limited, for example, a method in which the above polyvinyl acetal resin is mixed with conductive powders, an organic solvent, a plasticizer, a dispersant, and the like is mentioned, more specifically, a method in which a binder resin containing the above polyvinyl acetal resin, conductive powders, an organic solvent, and various additives that add as needed are mixed using various mixers such as a ball mill, a blender mill, a three-roller milling machine, or the like is mentioned.

By laminating a ceramic green sheet on which a conductive paste has been coated, a laminated ceramic capacitor can be produced. Herein, at least one of the ceramic green sheet and the conductive paste may be the ceramic green sheet of the present invention, or the conductive paste of the present invention, the ceramic green sheet of the present invention on which a conductive paste that is not the conductive paste of the present invention has coated may be laminated, a ceramic green sheet that is not the ceramic green sheet of the present invention on which the conductive paste of the present invention has coated may be laminated, and the ceramic green sheet of the present invention on which the conductive paste of the present invention has coated may be laminated. As described above, a laminated ceramic capacitor that is obtained using at least one of the ceramic green sheet of the present invention and the conductive paste of the present invention is also included in the present invention.

As a production method of the laminated ceramic capacitor of the present invention, it is not particularly limited, a conventionally known production method can be employed. For example, a method in which plural ceramic green sheets (the ceramic green sheets of the present invention, and the like) on the surfaces of which a conductive paste that is to be an internal electrode has coated by a screen printing or the like, are piled up alternately and a laminated body is obtained by heating, crimping, and the like, the binder component and the like contained in the laminated body are pyrolytically decomposed and removed (delipidation treatment), and then an external electrode is sintered on the end face of the ceramic burned product obtained through firing, is mentioned.

The application using the polyvinyl acetal resin of the present invention is not particularly limited, however, in addition to a ceramic green sheet or a binder of internal electrode, for example, a material for paint, and a heat developing sensitive material are mentioned.

EXAMPLES

Hereinafter, the present invention is explained in more detail by referring to Examples, however, the present invention is not limited at all by these Examples. Further, in the following Examples, "%" and "parts" mean "mass %" and "parts by mass" unless otherwise specifically noted.

Measurements of the physical properties of a polyvinyl acetal resin were performed according to the following methods.

(Content Percentage of Vinylester Unit, Content Percentage of Vinyl Alcohol Unit, and Content Percentage of Acetalized Vinyl Alcohol Unit of Polyvinyl Acetal Resin)

A polyvinyl acetal resin was dissolved in DMSO-$d_6$ (dimethyl sulfoxide), and the $^1$H-NMR spectrum was measured and calculated.

(Glass Transition Point of Polyvinyl Acetal Resin)

As DSC (differential scanning calorimetry), using EXTAR6000 (RD220) manufactured by Seiko Instruments Inc., a polyvinyl acetal resin was heated at a heating rate of 10° C./minute from 30° C. to 150° C. in nitrogen, and then cooled to 30° C., and again heated at a heating rate of 10° C./minute to 150° C. The value measured after the re-heating was taken as the glass transition point.

(Water Absorption Rate of Polyvinyl Acetal Resin)

A test sample with thickness 0.2 mm×10 cm×10 cm was dried at 50° C. under reduced pressure for 6 days, and then the mass of the dried sample was measured when the dried sample was immersed in pure water at 20° C. for 24 hours, and the water absorption rate was determined according to the following equation.

Water absorption rate(mass %)=(mass after immersion−mass of dried sample before immersion)/(mass of dried sample before immersion)×100

Example 1

Preparation of Polyvinyl Acetal Resin

Into a glass container with an inner volume of 2 L provided with a reflux condenser, a thermometer, and an anchor-type impeller, 1295 g of ion exchanged water, and 105 g of polyvinyl alcohol (PVA-1: polymerization degree 1700, saponification degree 99.0 mol %) were charged, the whole was heated to 95° C. to thoroughly dissolve the polyvinyl alcohol, and thus a polyvinyl alcohol aqueous solution (concentration 7.5 mass %) was prepared. The prepared polyvinyl alcohol aqueous solution was cooled to 13° C. over around 30 minutes while stirring at a rotation rate of 120 rpm, and then the resultant aqueous solution was added with 70.5 g of 3-methylbutanal, and further added with 100 mL of hydrochloric acid with a concentration of 20 mass % as an acid catalyst that is an acetalization catalyst, and the acetalization of polyvinyl alcohol was started. After performing the acetalization for 15 minutes, the whole of the resultant mixture was heated to 47° C. over 120 minutes, and was kept at 47° C. for 180 minutes, and then cooled to the room temperature. The resin precipitated by cooling was filtered, and washed with ion exchanged water (ion exchanged water with 100-fold amount of that of the resin) 10 times, and then added with 0.3 mass % sodium hydroxide aqueous solution to neutralization, kept at 50° C. for 5 hours, and then further washed with the ion exchanged water with 100-fold amount 10 times repeatedly, and dehydrated, and then dried at 40° C. under reduced pressure for 18 hours, and thus a polyvinyl acetal resin (PVIV-1) was obtained. The obtained polyvinyl acetal resin (PVIV-1) had the content percentage of the vinyl alcohol unit acetalized with 3-methylbutanal of 69.0 mol % (the degree of acetalization was 69.0 mol %), the content percentage of the vinylester unit of 1.0 mol %, and the content percentage of the vinyl alcohol unit of 30.0 mol %.

(Preparation of Slurry Composition)

10 parts by mass of the obtained polyvinyl acetal resin was added to a mixed solvent of 20 parts by mass of toluene and 20 parts by mass of xylene, the resultant mixture was dissolved while stirring, further added with 8 parts by mass of DOP as a plasticizer and dissolved while stirring. The obtained resin solution was added with 100 parts by mass of barium titanate (BT-03 manufactured by Sakai Chemical Industry Co., Ltd. (average particle diameter 0.3 μm)) as a ceramic powder, and mixed for 48 hours by a ball mill to obtain a slurry composition.

Example 2

By using polyvinyl alcohol (PVA-2: polymerization degree 800, saponification degree 99.0 mol %) instead of PVA-1, a polyvinyl acetal resin (PVIV-2) was obtained in the same manner as in Example 1 except that 73.5 g of 3-methylbutanal was used. The content percentage of the vinyl alcohol unit acetalized with 3-methylbutanal was 71.2 mol % (the degree of acetalization was 71.2 mol %), the content percentage of the vinylester unit was 1.0 mol %, and the content percentage of the vinyl alcohol unit was 27.8 mol %. Next, a slurry composition was obtained by using PVIV-2 in the same manner as in Example 1.

Example 3

By using polyvinyl alcohol (PVA-3: polymerization degree 2400, saponification degree 99.0 mol %) instead of PVA-1, a polyvinyl acetal resin (PVIV-3) was obtained in the same manner as in Example 1 except that 70.5 g of 3-methylbutanal was used. The content percentage of the vinyl alcohol unit acetalized with 3-methylbutanal was 68.4 mol % (the degree of acetalization was 68.4 mol %), the content percentage of the vinylester unit was 1.0 mol %, and the content percentage of the vinyl alcohol unit was 30.6 mol %. Next, a slurry composition was obtained by using PVIV-3 in the same manner as in Example 1.

Example 4

By using polyvinyl alcohol (PVA-4: polymerization degree 4300, saponification degree 99.0 mol %) instead of PVA-1, a polyvinyl acetal resin (PVIV-4) was obtained in the same manner as in Example 1 except that 75.6 g of 3-methylbutanal was used. The content percentage of the vinyl alcohol unit acetalized with 3-methylbutanal was 73.8 mol % (the degree of acetalization was 73.8 mol %), the content percentage of the vinylester unit was 1.0 mol %, and the content percentage of the vinyl alcohol unit was 25.2 mol %. Next, a slurry composition was obtained by using PVIV-4 in the same manner as in Example 1.

Example 5

By using polyvinyl alcohol (PVA-5: polymerization degree 1700, saponification degree 88.0 mol %) instead of PVA-1, a polyvinyl acetal resin (PVIV-5) was obtained in the same manner as in Example 1 except that 64.6 g of 3-methylbutanal was used. The content percentage of the vinyl alcohol unit acetalized with 3-methylbutanal was 71.2 mol % (the degree of acetalization was 71.2 mol %), the content percentage of the vinylester unit was 12.0 mol %, and the content percentage of the vinyl alcohol unit was 16.8 mol %. Next, a slurry composition was obtained by using PVIV-5 in the same manner as in Example 1.

Example 6

By using polyvinyl alcohol (PVA-6: polymerization degree 3500, saponification degree 88.0 mol %) instead of PVA-1, a polyvinyl acetal resin (PVIV-6) was obtained in the same manner as in Example 1 except that 62.5 g of 3-methylbutanal was used. The content percentage of the vinyl alcohol unit acetalized with 3-methylbutanal was 69.7 mol % (the degree of acetalization was 69.7 mol %), the content percentage of the vinylester unit was 12.0 mol %, and the content percentage of the vinyl alcohol unit was 18.3 mol %. Next, a slurry composition was obtained by using PVIV-6 in the same manner as in Example 1.

Example 7

A polyvinyl acetal resin (PVIV-7) was obtained in the same manner as in Example 1 except that 81.6 g of 3-methylbutanal was used. The content percentage of the vinyl alcohol unit acetalized with 3-methylbutanal was 79.0 mol % (the degree of acetalization was 79.0 mol %), the content percentage of the vinylester unit was 1.0 mol %, and the content percentage of the vinyl alcohol unit was 20.0 mol %.

Next, a slurry composition was obtained by using PVIV-7 in the same manner as in Example 1.

Example 8

A polyvinyl acetal resin (PVIV-8) was obtained in the same manner as in Example 1 except that 66.6 g of 3-methylbutanal was used. The content percentage of the vinyl alcohol unit acetalized with 3-methylbutanal was 65.0 mol % (the degree of acetalization was 65.0 mol %), the content percentage of the vinylester unit was 1.0 mol %, and the content percentage of the vinyl alcohol unit was 34.0 mol %. Next, a slurry composition was obtained by using PVIV-8 in the same manner as in Example 1.

Example 9

By using polyvinyl alcohol (PVA-7: polymerization degree 500, saponification degree 99.0 mol %) instead of PVA-1, a polyvinyl acetal resin (PVIV-9) was obtained in the same manner as in Example 1 except that 70.5 g of 3-methylbutanal was used. The content percentage of the vinyl alcohol unit acetalized with 3-methylbutanal was 69.0 mol % (the degree of acetalization was 69.0 mol %), the content percentage of the vinylester unit was 1.0 mol %, and the content percentage of the vinyl alcohol unit was 30.0 mol %. Next, a slurry composition was obtained by using PVIV-9 in the same manner as in Example 1.

Example 10

By using polyvinyl alcohol (PVA-8: polymerization degree 5000, saponification degree 99.0 mol %) instead of PVA-1, a polyvinyl acetal resin (PVIV-10) was obtained in the same manner as in Example 1 except that 71.5 g of 3-methylbutanal was used. The content percentage of the vinyl alcohol unit acetalized with 3-methylbutanal was 70.0 mol % (the degree of acetalization was 70.0 mol %), the content percentage of the vinylester unit was 1.0 mol %, and the content percentage of the vinyl alcohol unit was 29.0 mol %. Next, a slurry composition was obtained by using PVIV-10 in the same manner as in Example 1.

Example 11

A polyvinyl acetal resin (PVIV-11) was obtained in the same manner as in Example 1 except that 44.6 g of 3-methylbutanal and 30.5 g of butylaldehyde were used as aldehyde. The content percentage of the vinyl alcohol unit acetalized with 3-methylbutanal was 42.9 mol %, the content percentage of the vinyl alcohol unit acetalized with butylaldehyde was 36.1 mol % (the degree of acetalization was 79.0 mol %), the content percentage of the vinylester unit was 1.0 mol %, and the content percentage of the vinyl alcohol unit was 20.0 mol %. Next, a slurry composition was obtained by using PVIV-11 in the same manner as in Example 1.

Example 12

A polyvinyl acetal resin (PVIV-12) was obtained in the same manner as in Example 1 except that 42.6 g of 3-methylbutanal and 20.2 g of acetaldehyde were used as aldehyde. The content percentage of the vinyl alcohol unit acetalized with 3-methylbutanal was 41.0 mol %, the content percentage of the vinyl alcohol unit acetalized with acetaldehyde was 38.0 mol % (the degree of acetalization was 79.0 mol %), the content percentage of the vinylester unit was 1.0 mol %, and the content percentage of the vinyl alcohol unit was 20.0 mol %. Next, a slurry composition was obtained by using PVIV-12 in the same manner as in Example 1.

Comparative Example 1

A polyvinyl acetal resin (PVB-A) was obtained in the same manner as in Example 1 except that 65.0 g of butylaldehyde was used as aldehyde. The content percentage of the vinyl alcohol unit acetalized with butylaldehydeal was 68.8 mol % (the degree of acetalization was 68.8 mol %), the content percentage of the vinylester unit was 1.0 mol %, and the content percentage of the vinyl alcohol unit was 30.2 mol %. Next, a slurry composition was obtained by using PVB-A in the same manner as in Example 1.

Comparative Example 2

By using polyvinyl alcohol (PVA-9: polymerization degree 3500, saponification degree 99.0 mol %) instead of PVA-1, a polyvinyl acetal resin (PVB-B) was obtained in the same manner as in Example 1 except that 25.1 g of acetaldehyde and 31.0 g of butylaldehyde were used as aldehyde. The content percentage of the vinyl alcohol unit acetalized with butylaldehyde was 36.0 mol %, the content percentage of the vinyl alcohol unit acetalized with acetaldehyde was 44.4 mol % (the degree of acetalization was 80.4 mol %), the content percentage of the vinylester unit was 1.0 mol %, and the content percentage of the vinyl alcohol unit was 18.6 mol %. Next, a slurry composition was obtained by using PVB-B in the same manner as in Example 1.

Comparative Example 3

By using polyvinyl alcohol (PVA-10: polymerization degree 6500, saponification degree 88.0 mol %) instead of PVA-1, a polyvinyl acetal resin (PVIV-13) was obtained in the same manner as in Example 1 except that 69.0 g of 3-methylbutanal was used as aldehyde. The content percentage of the vinyl alcohol unit acetalized with 3-methylbutanal was 73.9 mol % (the degree of acetalization was 73.9 mol %), the content percentage of the vinylester unit was 12.0 mol %, and the content percentage of the vinyl alcohol unit was 14.1 mol %. Next, it was tried to prepare a slurry composition by using PVIV-13 in the same manner as in Example 1, however, the dispersion was poor, and thus a slurry composition was not obtained.

Comparative Example 4

By using polyvinyl alcohol (PVA-11: polymerization degree 150, saponification degree 99.0 mol %) instead of PVA-1, a polyvinyl acetal resin (PVIV-14) was obtained in the same manner as in Example 1 except that 69.0 g of 3-methylbutanal was used as aldehyde. The content percentage of the vinyl alcohol unit acetalized with 3-methylbutanal was 66.8 mol % (the degree of acetalization was 66.8 mol %), the content percentage of the vinylester unit was 1.0 mol %, and the content percentage of the vinyl alcohol unit was 32.2 mol %. Next, a slurry composition was obtained by using PVIV-14 in the same manner as in Example 1.

Comparative Example 5

By using polyvinyl alcohol (PVA-12: polymerization degree 1700, saponification degree 69.0 mol %) instead of PVA-1, a polyvinyl acetal resin (PVIV-15) was obtained in the same manner as in Example 1 except that 39.0 g of 3-methylbutanal was used as aldehyde. The content percentage of the vinyl alcohol unit acetalized with 3-methylbutanal was 50.0 mol % (the degree of acetalization was 50.0 mol %), the content percentage of the vinylester unit was 31.0 mol %, and the content percentage of the vinyl alcohol unit was 19.0 mol %. Next, a slurry composition was obtained by using PVIV-15 in the same manner as in Example 1.

Comparative Example 6

A polyvinyl acetal resin (PVIV-16) was obtained in the same manner as in Example 1 except that 54.0 g of 3-methylbutanal was used as aldehyde. The content percentage of the vinyl alcohol unit acetalized with 3-methylbutanal was 53.6 mol % (the degree of acetalization was 53.6 mol %), the content percentage of the vinylester unit was 1.0 mol %, and the content percentage of the vinyl alcohol unit was 45.4 mol %. Next, a slurry composition was obtained by using PVIV-16 in the same manner as in Example 1.

Comparative Example 7

A polyvinyl acetal resin (PVB-C) was obtained in the same manner as in Example 1 except that 45.0 g of butylaldehyde was used as aldehyde. The content percentage of the vinyl alcohol unit acetalized with butylaldehydeal was 78.0 mol % (the degree of acetalization was 78.0 mol %), the content percentage of the vinylester unit was 1.0 mol %, and the content percentage of the vinyl alcohol unit was 21.0 mol %. Next, a slurry composition was obtained by using PVB-C in the same manner as in Example 1.

(Preparation of Ceramic Green Sheet)

On the polyester film to which detached treatment had been performed, a slurry composition prepared in Examples 1 to 12 or Comparative Examples 1 to 7 was coated using a coater bar so that the thickness of the resultant after drying was 1 μm, and the resultant was air-dried at room temperature for 1 hour, and then dried at 80° C. for 3 hours by a hot air drier, and continuously dried at 120° C. for 2 hours, and thus a ceramic green sheet was obtained.

(Preparation of Conductive Paste)

100 parts by mass of nickel powder (2020SS manufactured by Mitsui Mining & Smelting Co., Ltd.) as a conductive powder, 5 parts by mass of ethyl cellulose (STD-100 manufactured by The Dow Chemical Company), and 60 parts by mass of Terpineol-C (manufactured by Nippon Terpene Chemicals, Inc.) as a solvent were mixed, and then kneaded with a three-roller milling machine to obtain a conductive paste.

(Preparation of Ceramic Burned Substance)

On one surface of the above-obtained ceramic green sheet, the above-obtained conductive paste was coated by a screen printing so that the thickness of a conductive layer after drying was around 1.0 μm, and the resultant was dried to form the conductive layer. The ceramic green sheet with the conductive layer was cut into 5 cm square pieces, 100 pieces were piled up, and heated and crimped at a temperature of 70° C. under a pressure of 150 kg/cm² for 10 minutes, and thus a laminated body was obtained. The obtained laminated body was heated to 400° C. at a heating rate of 3° C./minute under a nitrogen atmosphere, and kept for 5 hours, and then heated to 1350° C. at a heating rate of 5° C./minute, and kept for 10 hours, and thus a ceramic burned substance was obtained.

(Evaluation)

(Evaluation of Mechanical Strength)

The obtained ceramic green sheet was stripped off from the polyester film, and the condition of the sheet was observed and evaluated on three scales shown below. The results were shown in Table 1.

A: Tear and break were not observed in a ceramic green sheet.
B: Tear and break were slightly observed.
C: Tear and break were observed.

(Evaluation of Dimensional Stability in the Storage)

A ceramic green sheet with 30 cm×30 cm was stood still under constant temperature and constant humidity of 23° C. and 65% RH, the dimensional changes after the film production and 10 days after the film production were measured, and evaluated on two scales shown below. The results were shown in Table 1.

A: The dimensional change of a ceramic green sheet was less than 0.1%, and warp was not observed.
B: The dimensional change of a ceramic green sheet was 0.1% or more, and/or warp was observed.

(Evaluation of Delamination of Sintered Body)

The obtained ceramic burned substance (that had been cooled to room temperature) was divided into half, observed with an electron microscope, and the presence or absence of delamination of the ceramic layer and the conductive layer was observed, and evaluated on three scales shown below. The results were shown in Table 1.

A: Delamination was not observed.
B: Delamination was slightly observed.
C: Delamination was observed.

TABLE 1

| | Polyvinyl acetal resin | | | | | | | | Ceramic green sheet | | Capacitor (Ceramic burned substance) |
|---|---|---|---|---|---|---|---|---|---|---|---|
| | Polyvinyl acetal resin | Aldehyde | Polymerization degree | Vinyl alcohol Unit [mol %] | Vinylester Unit [mol %] | Acetalized vinyl alcohol Unit [mol %] | Glass transition temperature [° C.] | Water absorption rate [%] | Mechanical strength | Dimensional stability in storage | Delamination |
| Example 1 | PVIV-1 | 3-Methylbutanal | 1700 | 30.0 | 1.0 | 69.0 | 81 | 4.4 | A | A | A |
| Example 2 | PVIV-2 | 3-Methylbutanal | 800 | 27.8 | 1.0 | 71.2 | 80 | 4.2 | B | A | A |
| Example 3 | PVIV-3 | 3-Methylbutanal | 2400 | 30.6 | 1.0 | 68.4 | 82 | 4.3 | A | A | A |
| Example 4 | PVIV-4 | 3-Methylbutanal | 4300 | 25.2 | 1.0 | 73.8 | 79 | 3.8 | A | A | A |
| Example 5 | PVIV-5 | 3-Methylbutanal | 1700 | 16.8 | 12.0 | 71.2 | 74 | 3.3 | B | A | A |
| Example 6 | PVIV-6 | 3-Methylbutanal | 3500 | 18.3 | 12.0 | 69.7 | 75 | 3.6 | A | A | A |
| Example 7 | PVIV-7 | 3-Methylbutanal | 1700 | 20.0 | 1.0 | 79.0 | 77 | 3.1 | A | A | A |
| Example 8 | PVIV-8 | 3-Methylbutanal | 1700 | 34.0 | 1.0 | 65.0 | 84 | 4.6 | A | A | A |
| Example 9 | PVIV-9 | 3-Methylbutanal | 500 | 30.0 | 1.0 | 69.0 | 82 | 4.4 | B | A | A |

TABLE 1-continued

| | Polyvinyl acetal resin | | | | | | | | Ceramic green sheet | | Capacitor (Ceramic burned substance) Delamination |
|---|---|---|---|---|---|---|---|---|---|---|---|
| | Polyvinyl acetal resin | Aldehyde | Polymerization degree | Vinyl alcohol Unit [mol %] | Vinylester Unit [mol %] | Acetalized vinyl alcohol Unit [mol %] | Glass transition temperature [° C.] | Water absorption rate [%] | Mechanical strength | Dimensional stability in storage | |
| Example 10 | PVIV-10 | 3-Methylbutanal | 5000 | 29.0 | 1.0 | 70.0 | 82 | 4.3 | A | A | B |
| Example 11 | PVIV-11 | 3-Methylbutanal Butylaldehyde | 1700 | 20.0 | 1.0 | 42.9 36.1 | 72 | 3.0 | B | A | A |
| Example 12 | PVIV-12 | 3-Methylbutanal Acetaldehyde | 1700 | 20.0 | 1.0 | 41.0 38.0 | 94 | 4.9 | A | A | A |
| Comparative Example 1 | PVB-A | Butylaldehyde | 1700 | 30.2 | 1.0 | 68.8 | 73 | 7.5 | C | B | C |
| Comparative Example 2 | PVB-B | Butylaldehyde Acetaldehyde | 3500 | 18.6 | 1.0 | 36.0 44.4 | 97 | 11.5 | A | B | C |
| Comparative Example 3 | PVIV-13 | 3-Methylbutanal | 6500 | 14.1 | 12.0 | 73.9 | 73 | 3.2 | Slurry was not prepared because of the poor dispersion | | |
| Comparative Example 4 | PVIV-14 | 3-Methylbutanal | 150 | 32.2 | 1.0 | 66.8 | 83 | 4.6 | C | Mold Release from PET film was impossible | |
| Comparative Example 5 | PVIV-15 | 3-Methylbutanal | 1700 | 19.0 | 31.0 | 50.0 | 70 | 5.3 | C | B | C |
| Comparative Example 6 | PVIV-16 | 3-Methylbutanal | 1700 | 45.4 | 1.0 | 53.6 | 88 | 8.4 | B | B | C |
| Comparative Example 7 | PVB-C | Butylaldehyde | 1700 | 21.0 | 1.0 | 78 | 70 | 5.4 | C | B | C |

INDUSTRIAL APPLICABILITY

According to the present invention, a polyvinyl acetal resin capable of obtaining a ceramic green sheet that has sufficient mechanical strength, in which the dimensional change in the storage is small, and the delamination hardly occurs in the delipidation, can be provided.

The invention claimed is:

1. A slurry composition, comprising:
   a polyvinyl acetal resin;
   a ceramic powder; and
   an organic solvent,
   wherein the polyvinyl acetal resin comprises a structural unit of formula (1) in the molecule:

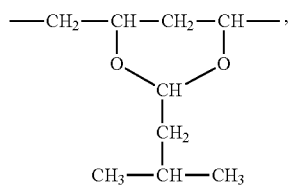
(1)

and
   the polyvinyl acetal resin has a degree of polymerization of from 1500 to 4500, a content of vinylester unit of from 0.01 to 30 mol %, and a degree of acetalization of from 55 to 83 mol %.

2. The slurry composition according to claim 1, wherein the degree of polymerization of the polyvinyl acetal resin is from 1700 to 3500.

3. The slurry composition according to claim 1, wherein the polyvinyl acetal resin is obtained by a process comprising acetalizing a polyvinyl alcohol resin with aldehyde comprising 3-methylbutanal.

4. The slurry composition according to claim 3, wherein the polyvinyl acetal resin comprises the structural unit of formula (1) in a content of no less than 50 mol % relative to a total molar amount of acetalized structural units.

5. The slurry composition according to claim 1, wherein the polyvinyl acetal resin further comprises a structural unit of formula (2):

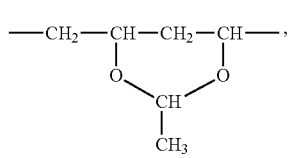
(2)

a structural unit of formula (3):

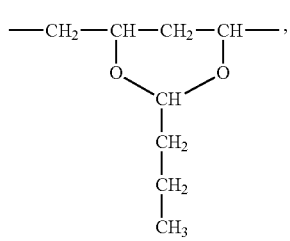
(3)

or both, in the molecule.

6. The slurry composition according to claim 1, wherein the polyvinyl acetal resin comprises the structural unit of formula (1) in a content of no less than 30 mol % relative to a total molar amount of acetalized structural units.

7. The slurry composition according to claim 1, wherein the degree of polymerization of the polyvinyl acetal resin is from 2000 to 3500.

8. The slurry composition according to claim 1, wherein the content of vinylester unit in the polyvinyl acetal resin is from 0.5 to 20 mol %.

9. The slurry composition according to claim 1, wherein the degree of acetalization of the polyvinyl acetal resin is from 65 to 80 mol %.

10. The slurry composition according to claim 1, wherein the polyvinyl acetal resin further comprises a structural unit obtained by acetalizing a polyvinyl alcohol resin with acetaldehyde.

11. The slurry composition according to claim 1, wherein the polyvinyl acetal resin further comprises a structural unit obtained by acetalizing a polyvinyl alcohol resin with butyraldehyde.

12. The slurry composition according to claim 1, wherein the ceramic powder is at least one selected from the group consisting of a powder of alumina, zirconia, aluminum silicate, titanium oxide, zinc oxide, barium titanate, magnesia, sialon, spinemulrite, silicon carbide, silicon nitride, and aluminum nitride.

13. The slurry composition according to claim 1, wherein the organic solvent is at least one selected from the group consisting of a ketone, an alcohol, an aromatic hydrocarbon, an ester, a glycol, and a terpene.

14. The slurry composition according to claim 13, wherein the alcohol is at least one selected from the group consisting of methanol, ethanol, isopropanol, and butanol.

15. The slurry composition according to claim 13, wherein the ketone is at least one selected from the group consisting of acetone, methyl ethyl ketone, dipropyl ketone, and diisobutyl ketone.

16. The slurry composition according to claim 13, wherein the aromatic hydrocarbon is at least one of toluene and xylene.

17. The slurry composition according to claim 13, wherein the ester is at least one selected from the group consisting of methyl propionate, ethyl propionate, butyl propionate, methyl butyrate, ethyl butyrate, butyl butyrate, methyl pentanoate, ethyl pentanoate, butyl pentanoate, methyl hexanoate, ethyl hexanoate, butyl hexanoate, 2-ethylhexyl acetate, and 2-ethylhexyl butyrate.

18. The slurry composition according to claim 13, wherein the glycol is at least one selected from the group consisting of methyl cellosolve, ethyl cellosolve, butyl cellosolve, α-terpineol, butyl cellosolve acetate, and butyl carbitol acetate.

19. The slurry composition according to claim 13, wherein the terpene is terpineol.

20. A ceramic green sheet, obtained by coating a support with the slurry composition according to claim 1 and then drying the slurry composition.

* * * * *